(12) United States Patent
Rissanen

(10) Patent No.: US 9,049,237 B2
(45) Date of Patent: *Jun. 2, 2015

(54) SYSTEM AND METHOD FOR PERFORMING PARTIAL EVALUATION IN ORDER TO CONSTRUCT A SIMPLIFIED POLICY

(71) Applicant: AXIOMATICS AB, Stockholm (SE)

(72) Inventor: Erik Rissanen, Kista (SE)

(73) Assignee: AXIOMATICS AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/323,521

(22) Filed: Jul. 3, 2014

(65) Prior Publication Data

US 2014/0317685 A1    Oct. 23, 2014

Related U.S. Application Data

(63) Continuation of application No. 14/022,975, filed on Sep. 10, 2013, which is a continuation-in-part of application No. 13/884,187, filed as application No. PCT/EP2011/069691 on Nov. 8, 2011, now abandoned.

(60) Provisional application No. 61/435,030, filed on Jan. 21, 2011.

(30) Foreign Application Priority Data

Nov. 8, 2010 (SE) ........................................ 1051167

(51) Int. Cl.
*H04L 29/06* (2006.01)
*G06F 21/00* (2013.01)

(52) U.S. Cl.
CPC ................ *H04L 63/20* (2013.01); *G06F 21/00* (2013.01); *H04L 63/10* (2013.01)

(58) Field of Classification Search
CPC ............................... H04L 63/10; H04L 63/20
See application file for complete search history.

(56) References Cited

U.S. PATENT DOCUMENTS

| | | | | |
|---|---|---|---|---|
| 8,117,640 | B1 * | 2/2012 | Moriconi et al. | 726/1 |
| 8,655,824 | B1 * | 2/2014 | Allen et al. | 706/47 |
| 2007/0157288 | A1 * | 7/2007 | Lim | 726/1 |
| 2009/0138960 | A1 * | 5/2009 | Felty et al. | 726/14 |
| 2009/0178107 | A1 * | 7/2009 | Karjoth et al. | 726/1 |
| 2009/0320093 | A1 * | 12/2009 | Glazier et al. | 726/1 |
| 2010/0042973 | A1 * | 2/2010 | Anderson et al. | 717/120 |

(Continued)

OTHER PUBLICATIONS

Marouf, Said; Shehab, Mohamed; Squicciarini, Anna; Sundareswaran, Smitha; "Adaptive Reordering and Clustering-Based Framework for Efficient XACML Policy Evaluation", IEEE Transactions on Services Computing, vol. 4, Issue 4, Nov. 14, 2011, pp. 300-313.*

(Continued)

*Primary Examiner* — Victor Lesniewski
(74) *Attorney, Agent, or Firm* — Buchanan Ingersoll & Rooney P.C.

(57) ABSTRACT

Methods and devices for constructing a simplified attribute-based access control policy, which more faithfully reproduces not only Permit and Deny decisions but also data relating to errors and quasi-errors resulting from the evaluation. To this end, the simplified policy includes new data fields for storing intermediate results. Further, improved simplification rules allowing partial evaluation to be used in a broader range of situations.

10 Claims, 4 Drawing Sheets

(56) References Cited

U.S. PATENT DOCUMENTS

| | | | | |
|---|---|---|---|---|
| 2010/0257579 | A1* | 10/2010 | Karjoth et al. | 726/1 |
| 2010/0306818 | A1* | 12/2010 | Li et al. | 726/1 |
| 2011/0314261 | A1* | 12/2011 | Brucker et al. | 712/207 |
| 2012/0124643 | A1* | 5/2012 | Moriconi et al. | 726/1 |
| 2012/0158931 | A1* | 6/2012 | Ohlman et al. | 709/223 |
| 2012/0284769 | A1* | 11/2012 | Dixon et al. | 726/1 |
| 2013/0036447 | A1* | 2/2013 | Lassesen | 726/1 |

OTHER PUBLICATIONS

Hsieh, George; Foster, Keith; Emamali, Gerald; Patrick, Gregory; Marvel, Lisa; "Using XACML for Embedded and Fine-Grained Access Control Policy", International Conference on Availability, Reliability and Security, Mar. 16-19, 2009, pp. 462-468.*

International Search Report (PCT/ISA/210) mailed on Feb. 24, 2012, by the European Patent Office as the International Searching Authority for International Application No. PCT/EP2011/069691.

Written Opinion (PCT/ISA/237) mailed on Feb. 24, 2012, by the European Patent Office as the International Searching Authority for International Application No. PCT/EP2011/069691.

International Preliminary Report on Patentability (PCT/IPEA/409) mailed on Mar. 28, 2013, by the European Patent Office as the International Preliminary Examining Authority for International Application No. PCT/EP2011/069691.

Sandberg, "Administrative Queries in XACML—feasibility of partial query evaluation", Dec. 2006, XP55019353, pp. 1-125, http://daisy.dsv.su.se/fil/visa?id=33282.

* cited by examiner

-- Prior Art --

SYSTEM AND METHOD FOR PERFORMING PARTIAL EVALUATION IN ORDER TO CONSTRUCT A SIMPLIFIED POLICY

CROSS-REFERENCE TO RELATED APPLICATIONS

The present application is a continuation of U.S. application Ser. No. 14/022,975, filed on Sep. 10, 2013, which is a continuation-in-part of U.S. application Ser. No. 13/884,187, filed on May 8, 2013, which is a national stage of International Application No. PCT/EP2011/069691, filed on Nov. 8, 2011, which claims the benefit of U.S. Provisional Application No. 61/435,030, filed on Jan. 21, 2011 and which claims the benefit of Swedish Application No. 1051167-3, filed on Nov. 8, 2010. The entire contents of each of U.S. application Ser. No. 14/022,975, U.S. application Ser. No. 13/884,187, International Application No. PCT/EP2011/069691, U.S. Provisional Application No. 61/435,030, and Swedish Application No. 1051167-3 are hereby incorporated herein by reference in their entirety.

TECHNICAL FIELD

The invention disclosed herein generally relates to the field of access control (AC) in computer systems. In particular, it provides devices and methods for efficient evaluation of a plurality of related access requests to an attribute-based access control (ABAC) policy.

BACKGROUND OF THE INVENTION

An attribute-based AC (ABAC) policy defines access control permissions based on the attributes of the subject, of the resource, and of the action that the subject is to perform on the resource (e.g., read, write). When the policy is enforced in a computer system or computer network, it controls access to entities in the system or network and thereby influences their state of operation. A resource may be, inter alia, a portion of a personal storage quota, a business unit storage quota, an information retrieval system, a (portion of a) database, an online service, a protected webpage or a physical device.

Functional expressions, in particular rules, in an ABAC policy may be nested hierarchically in a conditional fashion, so that attribute values will influence what further rules are to be applied. To this end, an expression in a policy may evaluate not only to Permit and Deny, but also to Not applicable or a value equivalent to this. An expression may also evaluate to intermediate attribute values, bags of attribute values or assume an error state. In particular the expression may be divided into a target portion, which may trigger a Not applicable state, and a condition portion. Any conflicts arising in the decision making may be settled by way of appropriate combining algorithms, such as permit-overrides and deny-overrides. The final decision for an access control request is the result of a specifically identified top level object. Based on a policy or policy set (unless otherwise indicated, these terms are used interchangeably herein) that covers a broad range of resources and subjects and a given request, it is often possible to obtain a decision by evaluating only a fraction of all functional expressions in the policy. Conversely, it cannot always be ascertained prima facie whether a request contains enough attribute values to allow a successful policy evaluation.

To illustrate, a simple enterprise policy governs use of company printers and company documents (resources). For printers, the printer location is a remote attribute available in a directory. For documents, document classification, type, stage and author are remote attributes available in a database. For users (subjects), their clearance, office location, and nationality are remote attributes available in a directory. The policy (cf. FIG. 2) grants a user access to printers if his or her office is in the same location as the printer. For documents, access is allowed if the user has the same or higher clearance as the document classification, except for document on the "draft" stage, which may be accessed by the author only. Furthermore, if the document type is "military", then only users of domestic nationality may see the document.

There currently exist general-purpose AC languages that have the richness to express fine-grained conditions and conditions which depend on external data. One particular example of an AC language is the eXtensible Access Control Markup Language (XACML) which is the subject of standardization work in a Technical Committee within the Organization for the Advancement of Structured Information Standards (OASIS, 35 Corporate Drive Suite 150, Burlington, Mass.). A policy encoded with XACML consists of functional expressions in attribute values, and the return value (decision) of the policy is one of Permit, Deny, Not Applicable, or Indeterminate. An XACML policy can apply to many different situations, that is, different subjects, resources, actions and environments and may give different results for different combinations of these. The XACML specification defines how a policy is evaluated for a request (or access request), particularly what policy attributes are to be evaluated or, at least, which values are required to exist for a successful evaluation to result. Key characteristics of this evaluation process are that the access request (the query against the policy) must describe the attempted access to a protected resource fully. In practice, it may be that the request is constructed in multiple stages by different components, so that a PEP (Policy Enforcement Point) provides only some initial attribute values and a PDP (Policy Decision Point) or other components can dynamically fetch more attribute values from remote sources as they are needed.

In many situations, it is desirable to automatically derive from an XACML policy a subset which applies to a restricted situation, such as the policy which applies to a specified individual subject or resource, a type of subject or resource, a special action, a certain access location, and so on. The Master's thesis J. Sandberg, "Administrative queries in XACML—feasibility of partial-query evaluation", Department of Computer and Systems Sciences at Stockholm University and School of Computer Science and Communication, Royal Institute of Technology, Stockholm (2006), which is hereby included by reference, describes evaluation of so-called administrative queries (e.g., "What can user X do?") to a policy by an approach involving partial evaluation of the policy. Such partial evaluation is based on a partial request in which some attributes have been assigned values and some have been left undefined and yields as output a simplified policy, which is represented in the same form as the original policy but typically evaluates faster since it is expressed as a smaller amount of code and/or contains fewer variable attributes. It is expected that the simplified policy and the original policy provide identical access decision in response to identical requests, provided these requests do not contradict the partial request forming the basis for the partial evaluation.

In section 3.2 of Sandberg's thesis, several simplification rules are derived, including rules governing allowed simplifications of expressions (e.g., rules, policies and policy sets) joined by different combining algorithms, such as deny-overrides and permit-overrides. Examples of these simplification rules include:

1. Any expression evaluating to Not applicable is removed.
2. For expressions appearing under a deny-overrides rule combining algorithm:
   2.1. If there exists an expression that evaluates to Deny whose target is applicable, remove all other rules and return Deny.
   2.2. If there exists an expression that evaluates to Indeterminate whose target is applicable, remove any rule with a Permit effect.
   2.3. If there exists an expression that evaluates to Permit whose target is applicable, remove all expressions that evaluate to Indeterminate if their effect is Permit.
   2.4. If there exist no expressions with a Deny effect and at least one expression with a Permit effect, remove all other expressions and return Permit.
   2.5. If there exist no expressions with a Deny effect and all rules evaluate to Indeterminate, return Indeterminate.
3. For expressions appearing under a permit-overrides policy combining algorithm:
   3.1. If there is an expression evaluating to Permit whose target is applicable, remove all other expressions and return Permit.
   3.2. If there is an expression evaluated to Deny whose target is applicable, remove all expressions which have returned Indeterminate.

This approach is useful in the context of evaluating administrative queries, wherein it is feasible to verify that the requests to the simplified policy are consistent, i.e., do not contradict, the partial request forming the basis for the partial evaluation. It would be desirable, however, to broaden the applicability of the partial evaluation technique in the field of ABAC policies.

SUMMARY OF THE INVENTION

It is an object of the present invention to propose methods and devices for constructing a simplified ABAC policy such that this more faithfully reproduces not only Permit and Deny decisions but also data relating to errors and quasi-errors occurring in the evaluation. It is a further object to extend the applicability of partial evaluation to a broader range of situations.

In a normal evaluation of an access control policy it is possible that there are error conditions or that the policy does not match the access request. Therefore the possible decisions from an evaluation are not just Permit or Deny but also Not applicable or Indeterminate. Also, during normal access control policy evaluation, fragments of the full policy may consist of functional expressions which may evaluate to intermediate values of attribute values, bags of attribute values or Indeterminate. Also, other types of fragments of the policy, used to determinate whether a policy matches the request, may evaluate to intermediate values of Match, NoMatch or Indeterminate.

The result of a partial evaluation is an access control policy which applies to the situation described by the partial request which was used in the evaluation. During partial evaluation, fragments of the policy which are being evaluated may evaluate to simplified fragments, or any of the intermediate results mentioned above. In some cases it is possible to discard intermediate results during partial evaluation. For instance when evaluating a Boolean AND function, any argument of the function which evaluates to "True" may be discarded since the result of the function in that case will depend entirely of the other arguments of the AND function.

However, as the inventors have realized, there are cases in which such intermediate values cannot be discarded. Prior art does not handle these cases. For instance, if the first argument of an AND function results into a simplified expression for that argument and the second argument results in an Indeterminate, the AND expression cannot be simplified further and the Indeterminate of the second argument cannot be discarded. The reason is that the result of partial evaluation must be equivalent to the original AND expression with respect to any access control request which is consistent with the partial request. Since the first argument was simplified to a functional expression, which might take any value True, False or Indeterminate, then the effect of the second argument, which is Indeterminate, depends on the specifics of the access control request being evaluated later on the simplified expression. If the first argument evaluates to "True", then the Indeterminate of the second argument makes the whole AND expression Indeterminate. On the other hand, if the first argument would evaluate to "False", then the whole AND expression is false.

The prior art does not have the capability to encode the intermediate values into the resulting expressions. In the prior art, there are two options in a case like this. One option is to fail the partial evaluation process as a whole and return an exception. This is undesirable since in these cases the system relying on the partial evaluation method would fail to function at all.

The other option in prior art is to discard the intermediate values. This will lead to incorrect results for the system which relies on the partial evaluation method. For instance, assume in the example above that we have the following AND expression, with two nested expressions as arguments:

$$A = \text{AND}(\text{expr1}, \text{expr2})$$

Now assume that during partial evaluation expr1 evaluates to a simplified expression called expr1*. Expr2 evaluates to Indeterminate. The resulting simplified AND expression is then $$A^* = \text{AND}(\text{expr1*}, \text{Indeterminate})$$

However, prior art is not capable of encoding this expression into an access control policy. Discarding the Indeterminate leads to another simplified AND expression:

$$B = \text{AND}(\text{expr1*})$$

Alternatively, the Indeterminate may tentatively be replaced by True or False, which prior art is able to represent:

$$C = \text{AND}(\text{expr1*}, \text{True})$$

$$D = \text{AND}(\text{expr1*}, \text{False})$$

Expr1* will take the same value as expr1 if it is evaluated against an access control request. The following table illustrates the values of A, B, C and D, given the different possible values for expr1/expr1*.

| Expr1/expr1* | A | B | C | D |
| --- | --- | --- | --- | --- |
| True | Indeterminate | True | True | False |
| False | False | False | False | False |
| Indeterminate | Indeterminate | Indeterminate | Indeterminate | Indeterminate |

It is to be noted how none of the expressions B, C or D gives the same results as expression A, so this approach fails to meet the basic expectation from partial evaluation, namely, that the simplified expression returns identical results. A system relying on a prior art method for partial evaluation could malfunction at this point, leading to possibly severe complications even if the subsequent requests are found to be consistent with the partial request forming the basis for the partial evaluation.

The example illustrates that the representation used to encode the result of a partial evaluation of an access control policy must be able to encode intermediate results of policy fragments, including error conditions. In the prior art, access control policy languages do not allow for encoding the required intermediate results because such results are not needed in an access control policy which is directly constructed to represent the access control requirements of an organization. For instance, it is not possible in standard XACML to encode results of partial evaluation if certain error conditions occur.

In view of this, the invention provides a method and a system for partially evaluating an ABAC policy, in accordance with the independent claims. By the invention an enriched representation of the simplified policy is created for the purpose of storage, temporary caching or transmission to a different entity or process. The enriched representation includes a dedicated data field associated with an expression, for storing intermediate results of evaluation of the expression itself or an expression subordinate thereto.

In an embodiment, a condition result field operable to store at least a Permit or Deny result from the evaluation of the expression itself is included. Additionally or alternatively, a target result field operable to store at least a Not applicable result, which is a target matching result, from the evaluation of the expression itself.

When the invention is applied to a XACML context, a PolicySet, Policy or Rule will be able to contain a direct defined result within itself. The result may be any valid policy evaluation result, including any error condition, obligation and/or status code. This is needed because the impact of a PolicySet, Policy or Rule may not be known until the results of other PolicySets, Policies or Rules are known. In this case the result must be directly encoded so it is not lost. A PolicySet, Policy or Rule which contains such direct result always evaluates to that result for any access control request or partial request.

A Target expression of a PolicySet, Policy or a Rule can contain a direct matching result of Match, NoMatch or any error condition and status code. This also applies to any nested logical expressions, such as AllOf and AnyOf within the Target. The reason is that a fragment of target may evaluate to an intermediate result, whose significance could depend on the values of other fragments, which might not have been fully evaluated with the given partial request. Therefore this intermediate result must be represented in the simplified policy resulting from the partial evaluation.

The arguments of functional expressions, including Boolean functions, may consist of a direct defined result on closed form. This defined result may be an attribute value of any type (including values False, True, Permit and Deny), a bag of such attribute values or any error condition with status code. This is needed because there may be other arguments of the function which could not be evaluated such that the value of the function or the significance of the arguments can be determined. In these cases the intermediate values of the arguments of the function must be represented in the simplified policy resulting from the partial evaluation.

Returning to the general ABAC policy context, the new data field allows for several improved simplification rules, including:

An expression evaluable only to False is formed in the simplified ABAC policy for each expression in the full ABAC policy which is not completely evaluable under the partial request and which is connected by a Boolean AND function to at least one expression that evaluates under the partial request to False.

An expression evaluable only to Indeterminate is formed in the simplified ABAC policy for each expression in the full ABAC policy which is not completely evaluable under the partial request and which is connected by a target-type combining algorithm to at least one expression that evaluates under the partial request to Indeterminate.

An advantage associated with the first of the above simplification rules is that the total result of a policy evaluation is not necessarily false, but may be Indeterminate if the other expression evaluates to Indeterminate, so that the simplified ABAC policy is equivalent to the full ABAC policy.

As used herein, an expression which is not completely evaluable is one that does not evaluate to closed form, such as False, True, Permit, Deny or numerical or textual values, but which requires further argument values for definiteness. In these cases, it is necessary to form at least one functional expression in the simplified policy.

A Boolean AND function is defined in the XACML as an expression with the following properties:

AND returns True if there are no argument values.

The arguments are evaluated in order, from the first to last, where remaining arguments are not evaluated after a result is found.

If an argument evaluates to False, then the function is False.

Otherwise, if an argument evaluates to Indeterminate, then the function evaluates to Indeterminate.

Otherwise, if all arguments were True, then the function evaluates to True.

Regarding target-type combining algorithms in the XACML context, a Target is a hierarchical conditional expression. The target as a whole evaluates to Match, NoMatch or Indeterminate. The top level of the target is an operation over nested expressions. Each nested expression can return either Match, NoMatch or Indeterminate. The value of the Target as a whole is defined as follows, in the given order, over the possible values of the nested expressions:

If the target is empty, then the Target is a Match.

If all nested expressions return Match, then the Target is Match.

If at least one nested expression is NoMatch, then the Target is NoMatch.

Otherwise the Target is "Indeterminate".

As far as the XACML context is concerned, it is noted that the simplified policy may in some cases be represented in the same form as the original policy. However, the simplified policy may in some cases require a richer representation than standard XACML, possibly including new quasi-error states stemming from the fact that some attributes have not yet been evaluated (substituted). For instance, a situation may arise in which a rule cannot be evaluated for lack of values assumed by the attributes appearing in a condition or target in the rule. The simplified policy may then contain an indication that the rule is indeterminate, that is, temporarily overriding the standard evaluation rules, which may specify for this situation that an evaluation error is to be signaled. This is useful since it may turn out, when combining algorithms in the policy are applied, that the sub-tree in which this rule is located is inconsequential to the policy evaluation, so that this sub-tree may be eliminated from the simplified policy. It is noted that if the simplified policy cannot be represented in standard XACML, evaluation engines adapted for standard XACML may need to be modified to evaluate a simplified policy.

In the XACML context, one distinguishes Not applicable and Indeterminate as error states, wherein Not applicable may typically be returned by an expression in response to a formally correct request which however, by way of its target being different than the intended target of the expression, is not relevant. A request that contains formal deficiencies (e.g., too few arguments, incorrect data types) will, by contrast, be responded to by Indeterminate. By the distinction of a true error state (e.g., Indeterminate) and a quasi-error state (e.g., Not applicable) it becomes possible to collect expressions governing to a broad range of resources, subjects etc., as well as combinations of these, in one policy or policy set.

Furthermore, the inventors have realized that the partial evaluation approach suggested by Sandberg necessitates a continuous verification that any subsequent request to the simplified policy indeed does not contradict the partial request based on which the simplified policy was constructed. Consider the policy $$P(q)=\text{deny-overrides}(\text{Rule}A(q),\text{Rule}B(q)),$$

wherein RuleB is evaluable to one of Permit, Indeterminate and Not applicable (i.e., the effect of the rule is Permit and it cannot evaluate to Deny) and no assumption is made concerning RuleA. Further consider a partial request $q=q1$, for which $$\text{Rule}A(q1)=\text{Rule}A^*(q1)$$

$$\text{Rule}B(q1)=\text{Indeterminate}$$

where $\text{Rule}A^*(q)$ is a simplified rule which always gives the same result as $\text{Rule}A(q)$ given that the access request is consistent with the partial request $q1$.

By Sandberg's simplification rule 2.2, a simplified policy according to the prior art would not include RuleB, namely:

$$P_{PA}(q)=\text{deny-overrides}(\text{Rule}A^*(q)).$$

For a request $q2$, which is such that $$\text{Rule}A(q2)=\text{Not applicable}=\text{Rule}A^*(q2)[[\ ]]$$

$$\text{Rule}B(q2)=\text{Indeterminate},$$

the original policy will return $$P(q2)=\text{deny-overrides}(\text{Not applicable},\text{Indeterminate})=\text{Indeterminate}$$

provided the deny-overrides algorithm conforms to the XACML standard. However, the policy simplified according to the prior art will contradict the original (or full) policy by returning $$P_{PA}(q2)=\text{deny-overrides}(\text{Not applicable})=\text{Not applicable}.$$

The invention remedies this incoherence by methods and devices according to the independent claims, wherein at least one of the following simplification rules is included:

i) a rule stipulating that an expression evaluable to only Indeterminate is formed in the simplified ABAC policy for each expression in the full ABAC policy which evaluates under the partial request to Indeterminate and which is connected by a deny-overrides combining algorithm to at least one expression that is evaluable to Permit and not completely evaluable under the partial request;

ii) a rule stipulating that an expression evaluable to only Indeterminate is formed in the simplified ABAC policy for each expression in the full ABAC policy which evaluates under the partial request to Indeterminate and which is connected by a permit-overrides combining algorithm to at least one expression that is evaluable to Deny and not completely evaluable under the partial request.

Preferably, said at least one expression that evaluates to Indeterminate is located at the same level of the full policy as the expression which evaluates to Permit (rule i) or Deny (rule ii), respectively. As used herein, an expression may refer to a rule, a policy or a policy set.

Continuing the example above, the invention simplifies the full policy into:

$$P_{inv}(q)=\text{deny-overrides}(\text{Rule}A^*(q),\text{Rule}B^*(q)),$$

where $\text{Rule}B^*(q)=\text{Indeterminate}$ for all requests $q$, according to rule i. The invention removes the incoherence because:

$$P_{inv}(q2) = \text{deny-overrides}(\text{Not applicable, Indeterminate})$$
$$= \text{Indeterminate}$$
$$= P(q2).$$

A second example along the same lines may be elaborated in respect of a policy $$Q(q)=\text{permit-overrides}(\text{Rule}A(q),\text{Rule}B(q)),$$

wherein RuleA is evaluable to one of Deny, Indeterminate and Not applicable (i.e., the effect of the rule is Deny) and RuleB is arbitrary. Essentially, the second example may be obtained by substituting "deny" for "permit" and vice versa throughout. When this policy Q forms the basis for the construction of an equivalent simplified policy, simplification rule ii is applicable.

According to one embodiment, a system is operable to perform partial evaluation in order to construct a simplified policy for a set of attributes according. The system comprises a first storing means operable to store all policies for all sets of attributes. The system also comprises a partial request generation means operable to construct a partial request comprising a subset of said set of attributes via a policy information means operable to handle said set of attributes. Furthermore, the system also comprises a partial evaluation means connected to the first storing means, to the partial request generation means, to a second storing means operable to store simplified policies, and to the policy information means. The partial request means is also operable to send a partial request to the partial evaluation means, which in turn is operable to perform partial evaluation against the policy stored in the first storing means, resulting in a simplified policy, which is stored in said second storing means.

The main advantage with this system is that it is possible to derive a policy subset which applies to a restricted situation. A further advantage in this context is achieved if each set of attributes is a set of resource attributes, subject attributes, action attributes, environment attributes, or a combination of two or more of these alternatives. Furthermore, it is an advantage in this context if the system also comprises an input means connected to the first storing means, and operable to input a new policy or to amend a policy in the first storing means. A further advantage in this context is achieved if the first storing means and the second storing means each is in the form of a database, a file, a directory, or a combination of these alternatives. Furthermore, it is an advantage in this context if each of the attributes is either present, not present, or undefined.

In a further embodiment, a method for performing partial evaluation in order to construct a simplified policy for a set of attributes is performed with the aid of a system. The method comprises the steps:

with the aid of a partial request generation means, comprised in the system, to construct a partial request from the set of attributes via a policy information means, comprised in the system;

to send the partial request to a partial evaluation means, comprised in the system;

with the aid of a first storing means, comprised in the system, to store all policies for all sets of attributes;

to perform partial evaluation against the policy stored in the first storing means, resulting in a simplified policy; and with the aid of a second storing means, comprised in the system, to store the simplified policy.

The main advantage with this method is that it is possible to derive a policy subset which applies to a restricted situation. A further advantage in this context is achieved if each said set of attributes is a set of resource attributes, subject attributes, action attributes, environment attributes, or a combination of two or more of these alternatives.

Furthermore, it is an advantage in this context if the method also comprises the step:

with the aid of an input means, comprised in the system and connected to the first storing means, to input a new policy, or to amend a policy in the first storing means.

A further advantage in this context is achieved if each of the attributes is either present, not present, or undefined.

Furthermore, it is an advantage in this context if the step to perform partial evaluation is performed by substituting the attributes which are present in the partial request with values into the policy.

It is noted that the invention relates to all combinations of features, even if these are recited in mutually different claims.

BRIEF DESCRIPTION OF THE DRAWINGS

Embodiments of the invention will now be described with reference to the accompanying drawings, on which.

DETAILED DESCRIPTION OF EMBODIMENTS

Figure 1:
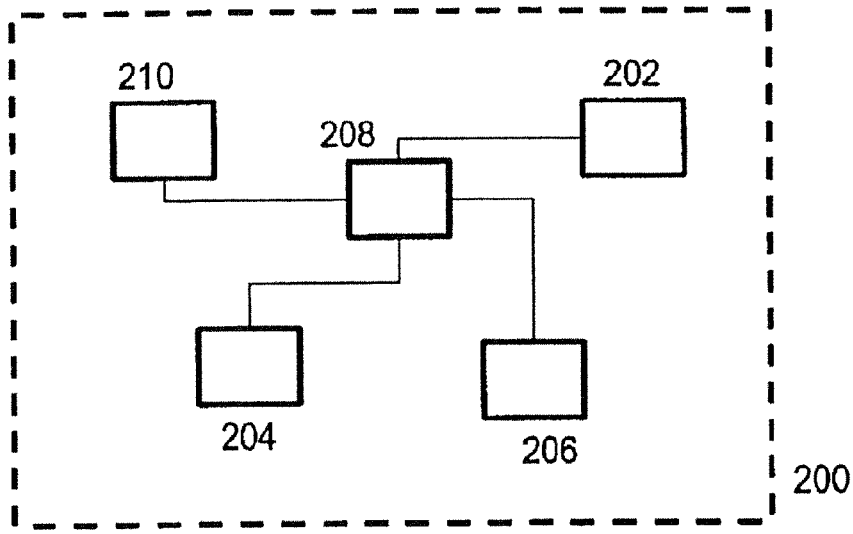
FIG. 1 is a block diagram of the XACML architecture according to prior art.

In FIG. 1 there is disclosed a block diagram of the XACML architecture 200, although simplified, according to the prior art. As stated before, XACML is an access control policy language. An attempt to access a resource 202 is described in terms of a "Request", which lists attributes of the subject 204, the resource 202, the action and the environment 206. Most kinds of "facts" about the subject 204, the resource 202, the action and the environment 206 can be described in terms of attributes. An attribute is an identifier, a data type and a value. It can also be described as a variable with a name (the identifier), a data type and a value. The request is constructed by a Policy Enforcement Point, PEP 208. The purpose of a PEP 208 is to guard access to a resource 202 and only let authorized users through. The PEP 208 itself does not know who is authorized; rather it submits the request to a Policy Decision Point, PDP 210, which contain policies about which requests that shall be permitted respective denied. The PDP 210 evaluates the policies, and returns a permit/deny response to the PEP 208. The PEP 208 then either lets the access proceed or stops it.

The fundamental purpose with this architecture is to establish separation of concerns, that is, to differentiate between policy decision making and policy enforcement. Enforcement is by its nature specific to a particular resource 202, while a decision engine can be made general purpose and reusable. In general policies can be nested in a tree form. Different policies are combined using so called combining algorithms which define which policy takes precedence over another.

Figure 2:
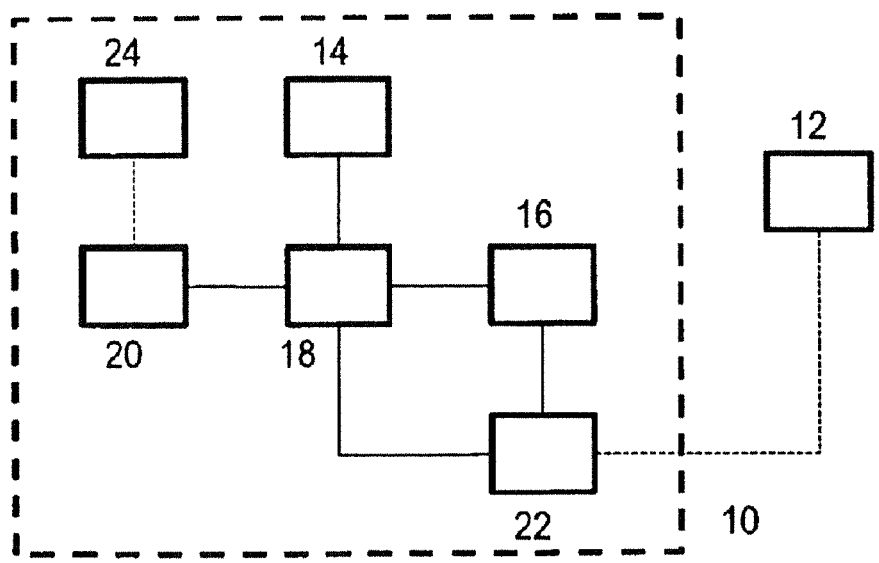
FIG. 2 is a block diagram of a system operable to perform partial evaluation in order to construct a simplified policy for a set of attributes according to the present invention.

In FIG. 2 there is disclosed a block diagram of a system operable to perform partial evaluation in order to construct a simplified policy for a set of attributes 12 according to the present invention. The system comprises a first storing means 14 operable to store all policies for all sets of attributes 12. Furthermore, the system also comprises a partial request generation means 16 operable to construct a partial request comprising a subset of the set of attributes 12 via a policy information means 22 operable to handle the set of attributes 12.

As is apparent in FIG. 2, the policy information means 22 is connected to the partial request generation means 16. The system also comprises a partial evaluation means 18 connected to the first storing means 14, to the partial request generation means 16, to a second storing means 20, and to the policy information means 22. The second storing means 22 is operable to store simplified policies. Furthermore, the partial request generation means 16 is also operable to send a partial request to the partial evaluation means 18, which in turn is operable to perform partial evaluation against the policy stored in the first storing means 14. The result of the partial evaluation is a simplified policy, which is stored in the second storing means 20.

According to a preferred embodiment of the system 10, each set of attributes 12 is a set of resource attributes, subject attributes, action attributes, environment attributes, or a combination of two or more of these alternatives.

According to another preferred embodiment, the system also comprises an input means 24 connected to the first storing means 14. The input means 24 is operable to input a new policy, or to amend a policy in the first storing means 14.

Furthermore, according to another alternative the first storing means 14 and the second storing means each is in the form of a database, a file, a directory, or a combination of these alternatives. The attributes can be partitioned into attributes which are present, attributes which are not present and attributes which are undefined. Since these three sets partition the set of possible attributes, it is necessary to only define two of them and the third is implied. Typically, the set of attributes which are present and the set of undefined attributes are explicitly listed in an actual request, but this need not always to be the case.

Figure 3:
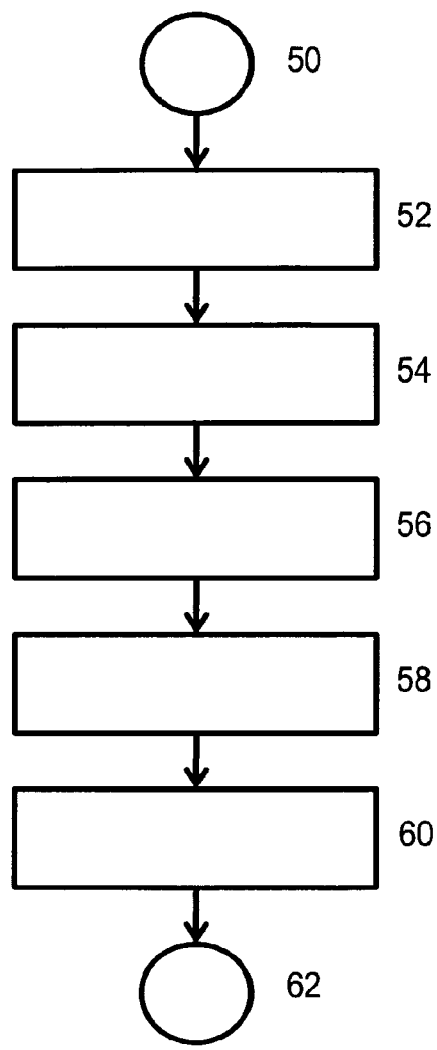
FIG. 3 is a flow chart of a method for performing partial evaluation in order to construct a simplified policy for a set of attributes according to the present invention.

In FIG. 3 there is disclosed a flow chart of a method for performing partial evaluation in order to construct a simplified policy for a set of attributes 12 (see FIG. 2) according to the present invention. The method is performed with the aid of a system (see FIG. 2). The method begins at block 50. The method continues, at block 52, with the step: with the aid of a partial request generation means 16, comprised in the system 10, to construct a partial request from the set of attributes 12 via a policy information means 22, comprised in the system 10. Thereafter, the method continues, at block 54, with the step: to send the partial request to a partial evaluation means 18 comprised in the system 10. The method continues, at block 56, with the step: with the aid of a storing means 14, comprised in the system 10, to store all policies for all sets of attributes 12. Thereafter, the method continues, at block 58, with the step: to perform partial evaluation against the policy stored in the first storing means 14, resulting in a simplified policy. The method continues, at block 60, with the step: with the aid of a second storing means 20, comprised in the system 10, to store the simplified policy. The method is completed at block 62.

According to a preferred embodiment of the method, each set of attributes 12 is a set of resource attributes, subject attributes, action attributes, environment attributes, or a combination of two or more of these alternatives.

According to another embodiment, the method also comprises the step:

with the aid of an input means 24, comprised in the system and connected to the first storing means 14, to input a new policy, or to amend a policy in the first storing means 14.

Furthermore, the attributes can be partitioned into attributes which are present, attributes which are not present and attributes which are undefined. Since these three sets partition the set of possible attributes, it is necessary to only define two of them and the third is implied. Typically, the set of attributes which are present and the set of undefined attributes are explicitly listed in an actual request, but this need not always to be the case.

According to a preferred embodiment of the method, the step to perform partial evaluation is performed by substituting the attributes which are present in the partial request with values into the policy.

Partial evaluation is evaluation of XACML against a request which contains undefined attributes. The parts of the policy tree which refer to the defined attributes can be evaluated as normally, while the parts which refer to undefined attributes are left unevaluated. The result of a partial evaluation is either a permit/deny, in case the defined attributes alone were sufficient to reach a definite conclusion, or a simplified policy in case the policy references undefined attributes. In general, by defining the restricted situation in terms of a partial request with the defining attributes of the situation, and other attributes undefined, the partial evaluation mechanism in general can be used to derive a policy subset/simplified policy which applies to the restricted situation. The policy subset/simplified policy will produce the same result as the full policy for each request which is consistent with the partial request used to derive the policy subset/simplified policy.

Figure 4:
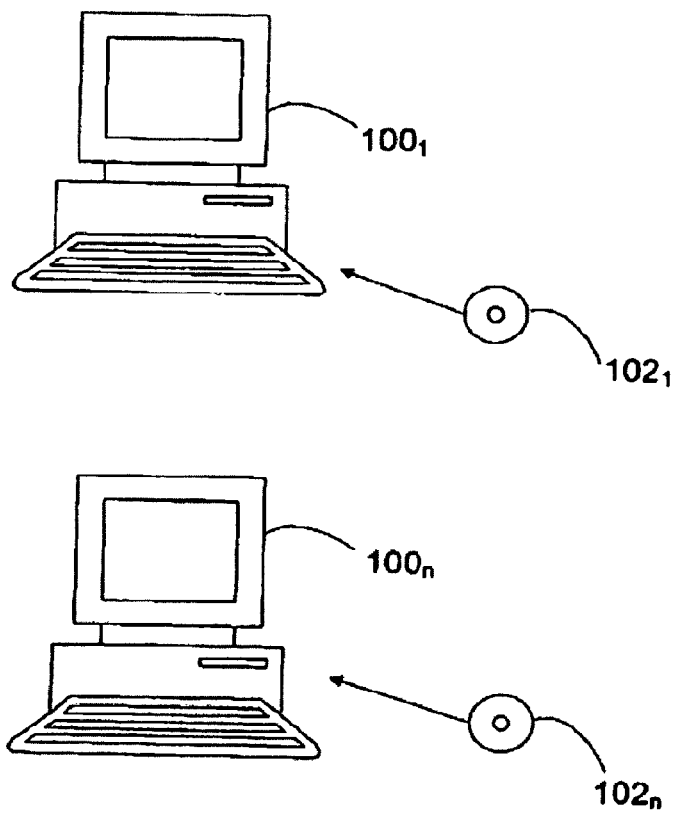
FIG. 4 schematically shows a number of computer program products according to the present invention.

In FIG. 4, computer program products 102$_1$, . . . , 102$_n$ according to the present invention are schematically shown. In FIG. 4, n different digital computers 100$_1$, . . . , 100$_n$ are shown, where n is an integer. In FIG. 4, n different computer program products 102$_1$, . . . , 102$_n$ are here shown in the form of compact discs. The different computer program products 102$_1$, . . . , 102$_n$ are directly loadable into the internal memory of the n different computers 100$_1$, . . . , 100$_n$. Each computer program product 102$_1$, . . . , 102$_n$ comprises software code portions for performing all the steps according to FIG. 3, when the product/products 102$_1$, . . . , 102$_n$ is/are run on the computers 100$_1$, . . . , 100$_n$.

Figure 5:
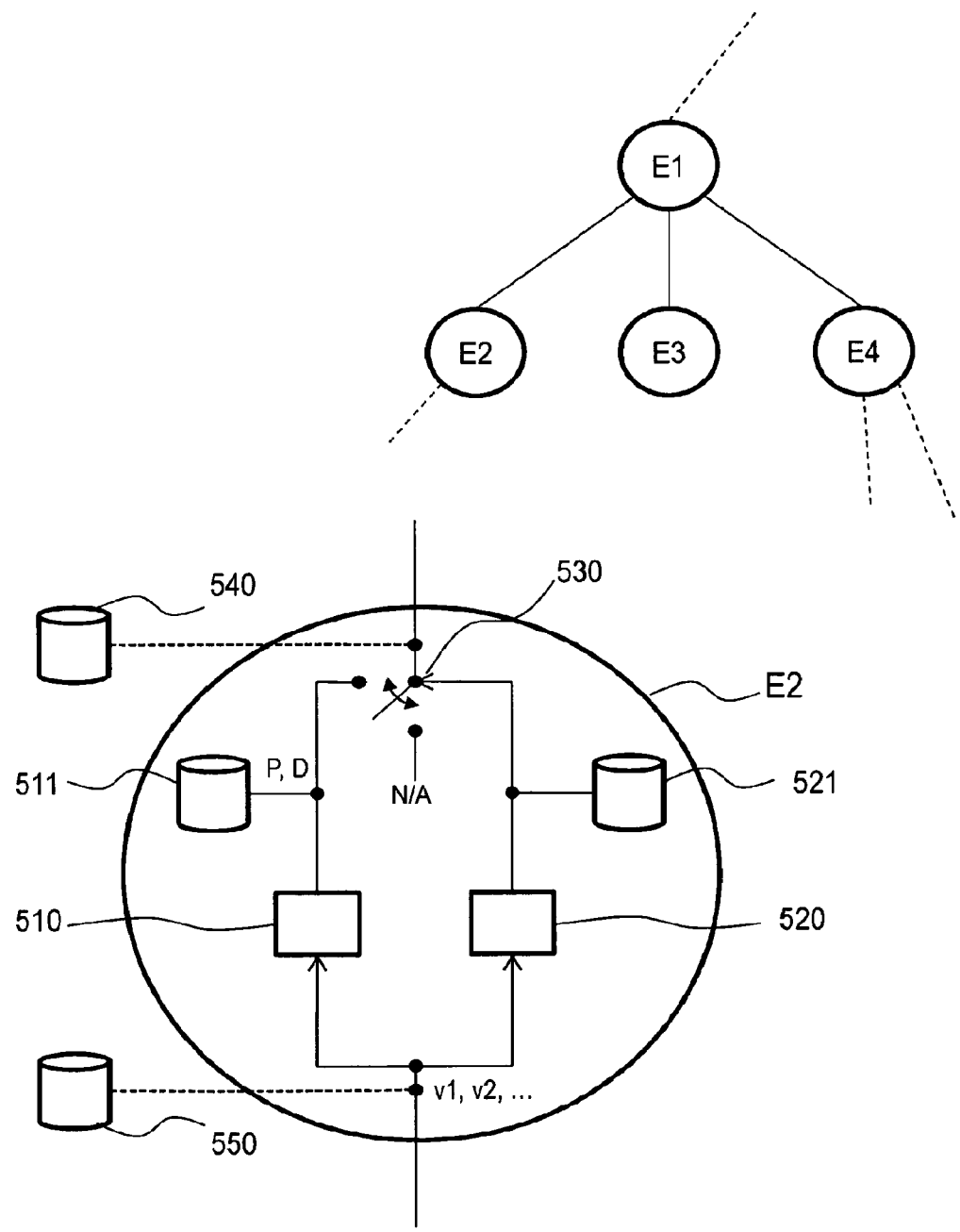
FIG. 5 is schematically shows a functional expression in a policy.

In the upper portion of FIG. 5, there is illustrated a portion of a policy tree containing functional expressions E1, E2, E3, E4. The expressions E2, E3, E4, which are on the same level, are connected by a combination algorithm included in expression E1, which may receive inputs data from each of the three other expressions. The lower portion of FIG. 5 shows in more detail expression E2, which receives as input attribute values v1, v2, . . . , which are supplied to condition evaluation unit 510 and target evaluation unit 520. While the condition evaluation unit 510 is configured to return, for a formally correct set of input data, a decision to Permit or Deny, the target evaluation unit 520 determines whether the expression E2 is applicable at all. As such, the output of the target evaluation unit 520 takes precedence over that of the condition evaluation unit 510, which has been symbolically shown in that the target evaluation unit 520 actuates a switch 530 operable to output from the expression E2 either the output of the condition evaluation unit 510 (as shown in the figure) or a Not applicable output (by setting the switch in the other position).

In accordance with the invention, the expression E2 includes a condition result memory 511 and a target result memory 512 so that evaluation results may be stored when the expression is included in a simplified policy. The memories 511, 512 may be embodied as dedicated memories, as memory positions in a shared memory, as data fields in a predefined policy format for transmission or storage.

As a variation to this, the memories 511, 512 may be replaced by a total result memory 540 for storing the final output of the expression E2.

As another variation, the memories 511, 512 and 540 may be replaced or supplemented by an argument memory 550 for storing the output of a further expression, subordinate to expression E2, which supplies the input to expression E2.

In XACML, a PolicySet or a Policy may contain a Target and zero or more nested PolicySets or Policies in the case of a PolicySet, or Rules in the case of a Policy. If there is no Target, then the PolicySet or Policy behaves as if there was a Target which is "Match".

There is a policy or rule combining algorithm which decides which of the nested elements determines the result of the PolicySet or Policy as a whole. The result is determined as follows, in the given order:

If the Target is Match, then the result is defined by the combining algorithm

If the Target is NoMatch, then the result is NotApplicable

If the Target is Indeterminate, then the result is Indeterminate

Note that for any combining algorithm, there is a defined partial evaluation function. The specifics of this function depends on the combining algorithm. Since there may be any number of combining algorithms, as users may define their own algorithms, we do not define any specific algorithm for partial evaluation of a combining algorithm. We just assume that the combining algorithm can be evaluated partially, where the inputs to the partial evaluation are the nested elements of the PolicySet or Policy and the output of the partial evaluation is either a defined decision in the form of Permit, Deny, NotApplicable or Indeterminate, or a list of simplified nested elements for the PolicySet or Policy.

In XACML, a rule contains an Effect, which is either Permit or Deny. A rule may contain a Target. A rule may also contain a Condition, which is a functional expression of arbitrary form, except that it returns a Boolean value. If a rule has no Target, it is treated as if it had a Target which evaluates to Match. A rule with no Condition is treated as if it had a condition which evaluates to True. A Rule is evaluated as follows, in the given order.

If the Target is Match and the Condition is True, then the Rule is its Effect.

If the Target is Match and the Condition is False, then the Rule is NotApplicable If the Target is Match and the Condition is Indeterminate, then the Rule is Indeterminate If the Target is NoMatch, then the rule is NotApplicable If the Target is Indeterminate, then the rule is Indeterminate

EXAMPLES

The following pseudo-code examples are included purely for illustration purposes and are not to be construed as limiting the scope of the present invention.

Example 1

To perform partial evaluation of a Boolean AND function, do the following:
1. Declare Boolean variable "GotSimplifiedExpression", and set it to false
2. Declare a list of arguments, called SimplifiedArgs, to be used if a simplified expression is to be returned as the result of this function. The list starts empty.
3. For each argument of the AND function, evaluate the argument, giving intermediate result R
   a. If R is Indeterminate
      i. If GotSimplifiedExpression is False, then return Indeterminate for the AND function result
      ii. Otherwise save the Indeterminate R as an intermediate result at the end of the list SimplifiedArgs
   b. If R is True
      i. Continue to the next argument
   c. If R is False
      i. If GotSimplifiedExpression is False, then return False as the values of the AND function result
      ii. Otherwise save the False R as an intermediate result at the end of the list SimplifiedArgs
   d. If R is a simplified expression
      i. Set GotSimplifiedExpression to True
      ii. Save the expression R as an intermediate result at the end of the list SimplifiedArgs
4. If GotSimplifiedExpression is False
   a. Return True
5. Otherwise
   a. Return a new AND function with the arguments in the list SimplifiedArgs.

Example 2

To perform partial evaluation at the top level of a Target, do the following.
1. Define variable atLeastOneIndeterminate of type MatchResult and set it to null
2. Define a list variable simplifiedTargetElements, which can collect simplified nested target expressions. The list starts as empty.
3. For each nested expression in the Target, evaluate the nested expression, giving a result R of type MatchResult
   a. If R is a simplified expression, save R in the list simplifiedTargetElements
   b. If R is NoMatch, then return NoMatch
   c. If R is Indeterminate, set atLeastOneIndeterminate to R
   d. If R is Match, then continue to the next nested expression
4. If atLeastOneIndeterminate is not null, and the list simplifiedTargetElements is empty, return atLeastOneIndeterminate
5. If the list simplifiedTargetElements is empty, return Match
6. If atLeastOneIndeterminate is not null, add atLeastOneIndeterminate to the list simplifiedTargetElements
Return a new Target containing the nested expressions in the list simplifiedTargetElements

Example 3

To perform partial evaluation of a PolicySet or a Policy, do the following.
1. Evaluate the Target, which gives the result T. If there is no Target, then T is "Match"
2. If T is NoMatch, then return NotApplicable
3. If T is Indeterminate, then return Indeterminate
4. Declare variable SimplifiedTarget and set it to null
5. If T is a simplified expression, set SimplifiedTarget to T
6. Perform partial evaluation on the combining algorithm, given the result C
7. If SimplifiedTarget is null
   a. If C is a list of simplified nested elements, return a new PolicySet or Policy with no target and the nested elements given by C
   b. Otherwise return C
8. Otherwise if SimplifiedTarget is not null
   a. If C is a list of simplified nested elements, return a new PolicySet or Policy with SimplifiedTarget as the Target and the nested elements given by C
   b. Otherwise return a new PolicySet or Policy with SimplifiedTarget as the Target and a nested defined decision as given by C

Example 4

To perform partial evaluation of a Rule, do the following.
1. Evaluate the Target, which gives the result T. If there is no Target, then T is "Match"
2. If T is NoMatch, then return NotApplicable
3. If T is Indeterminate, then return Indeterminate
4. Declare variable SimplifiedTarget and set it to null
5. If T is a simplified expression, set SimplifiedTarget to T
6. Perform partial evaluation on the condition, given the result C. If there is no Condition, then C is "True"
7. If SimplifiedTarget is null
   a. If C is a simplified expression, return a new Rule with no target and the condition given by C and the same effect as the Rule itself
   b. If C is True, return the Effect of the Rule
   c. If C is False, return NotApplicable
   d. If C is Indeterminate, return Indeterminate.
8. Otherwise if SimplifiedTarget is not null:
   a. If C is a simplified expression, return a new Rule with SimplifiedTarget as the Target and the condition given by C and the same effect as the Rule itself.
   b. If C is False, return a new Rule with SimplifiedTarget as the Target, no condition and a nested defined decision with NotApplicable.
   c. If C is True, return a new Rule with SimplifiedTarget as the Target, no condition and the same effect as the Rule itself.
   d. If C is Indeterminate, return a new Rule with SimplifiedTarget as the Target, no condition and a nested defined decision with the Indeterminate from C.

Embodiments

A computer system may include a subject (e.g., a user terminal) and a resource (e.g., a file, a webpage or a hardware device). The subject's access to the resource is controlled by a guard means (e.g., a server) adapted to evaluate an ABAC policy. A policy storage means, preferably a non-volatile storage, stores data representing an ABAC policy which specifies, in attribute-based form, the permissions which are currently to apply in the computer system. In typical circumstances, the ABAC policy is frequently updated, which is reflected in frequent modifications to the policy data stored in the policy storage means.

Advantageous embodiments of the invention include the following:

1. A system (10) operable to perform partial evaluation in order to construct a simplified policy for a set of attributes (12), said system (10) comprising a first storing means (14) operable to store all policies for all sets of attributes (12), characterized in that said system (10) also comprises a partial request generation means (16) operable to construct a partial request comprising a subset of said set of attributes (12) via a policy information means (22) operable to handle said set of attributes (12), a partial evaluation means (18) connected to said first storing means (14), to said partial request generation means (16), to a second storing means (20) operable to store simplified policies, and to said policy information means (22), wherein said partial request generation means (16) also is operable to send a partial request to said partial evaluation means (18), which in turn is operable to perform partial evaluation against the policy stored in said first storing means (14), resulting in a simplified policy, which is stored in said second storing means (20).

2. A system (10) operable to perform partial evaluation in order to construct a simplified policy for a set of attributes (12) according to embodiment 1, characterized in that each set of attributes (12) is a set of resource attributes, subject attributes, action attributes, environment attributes, or a combination of two or more of these alternatives.

3. A system (10) operable to perform partial evaluation in order to construct a simplified policy for a set of attributes (12) according to embodiment 1, or 2, characterized in that said system (10) also comprises an input means (24) connected to said first storing means (14), and operable to input a new policy or to amend a policy in said first storing means (14).

4. A system (10) operable to perform partial evaluation in order to construct a simplified policy for a set of attributes (12) according to any one of embodiments 1-3, characterized in that said first storing means (14) and said second storing means (20) each is in the form of a database (14; 20), a file (14; 20), a directory (14; 20), or a combination of these alternatives.

5. A system (10) operable to perform partial evaluation in order to construct a simplified policy for a set of attributes (12) according to any one of embodiments 1-4, characterized in that each of the attributes is either present, not present or undefined.

6. A method for performing, with the aid of a system (10), partial evaluation in order to construct a simplified policy for a set of attributes (12), said method comprises the steps:
  with the aid of a partial request generation means (16), comprised in said system (10), to construct a partial request from said set of attributes (12) via a policy information means (22), comprised in said system (10);
  to send said partial request to a partial evaluation means (18), comprised in said system (10);
  with the aid of a first storing means (14), comprised in said system (10), to store all policies for all sets of attributes (12);
  to perform partial evaluation against the policy stored in said first storing means (14), resulting in a simplified policy; and
  with the aid of a second storing means (20), comprised in said system (10), to store said simplified policy.

7. A method for performing partial evaluation in order to construct a simplified policy for a set of attributes (12) according to embodiment 6, characterized in that each said set of attributes (12) is a set of resource attributes, subject attributes, action attributes, environment attributes, or a combination of two or more of these alternatives.

8. A method for performing partial evaluation in order to construct a simplified policy for a set of attributes (12) according to embodiment 6, or 7, characterized in that said method also comprises the step:
  with the aid of an input means (24), comprised in said system (10) and connected to said first storing means (14), to input a new policy, or to amend a policy in said first storing means (14).

9. A method for performing partial evaluation in order to construct a simplified policy for a set of attributes (12) according to any one of embodiments 6-8, characterized in that each of said attributes is either present, not present, or undefined.

10. A method for performing partial evaluation in order to construct a simplified policy for a set of attributes (12) according to any one of embodiments 6-9, characterized in that said step to perform partial evaluation is performed by substituting said attributes which are present in said partial request with values into said policy.

11. At least one computer program product ($102_1, \ldots, 102_n$) directly loadable into the internal memory of at least one digital computer ($100_1, \ldots, 100_n$), comprising software code portions for performing the steps of embodiment 6 when said at least one product ($102_1, \ldots, 102_n$) is/are run on said at least one computer ($100_1, \ldots, 100_n$).

CLOSING REMARKS

Further embodiments of the present invention will become apparent to a person skilled in the art after studying the description above. In particular, the skilled person will realize in the light of this disclosure what additional adaptations are required in order for existing policy formats and policy evaluation systems to be able to benefit from partial evaluation in general situations. Such generalization work may proceed by a systematic survey of existing constructs (in particular, available functional expressions, such as rules, policies and policy sets, as well as their combining algorithms), wherein several situations, which may arise when partial evaluation leads to combinations of error, quasi-error and/or Permit/Deny results, are considered with a view to maintaining consistency between the simplified ABAC policy and the full ABAC policy.

Even though the present description and drawings disclose embodiments and examples, the invention is not restricted to these specific examples. For instance, the invention can be applied to control access to resources outside the context of computing; as an example, access to the premises in a building can be controlled if suitable identification means (e.g., card readers, biometric sensors, which identify a person as a subject in a guarding system) and actuators (e.g., electrically controllable door locks) are provided and are communicatively connected to a computer system for enforcing the AC policy. Furthermore, the exact order of the steps in a method disclosed above is not an essential feature of the invention unless this is clearly indicated or unless the outcome of a method step depends on input obtained from a different step, which is then necessarily prior in order. Similarly, in a sequence of conditional steps to be executed on an "otherwise" basis, the order of the steps can obviously not be changed arbitrarily. Thus, numerous modifications and variations can be made without departing from the scope of the present invention, which is defined by the accompanying claims. Any reference signs appearing in the claims are not to be understood as limiting their scope.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or nontransitory media) and communication media (or transitory media). As is well known to a person skilled in the art, the term computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A computer-implemented method of constructing a simplified attribute-based access control (ABAC) policy equivalent to a full ABAC policy, comprising:
   inputting, by an input unit of a computing device, a full ABAC policy comprising a plurality of attribute-dependent expressions, wherein each expression is evaluable to one of Not applicable, Indeterminate and either Permit or Deny;
   inputting, by the input unit of the computing device, a partial request comprising at least one attribute value and at least one attribute identified as variable;
   partially evaluating, by a processor of the computing device, said full ABAC policy by substituting said at least one attribute value for a corresponding attribute appearing in an expression in the policy, by evaluating said expression completely, and by forming, based on an evaluation result on closed form obtained by the complete evaluation of said expression and predetermined simplification rules, a simplified ABAC policy equivalent to the full ABAC policy;
   outputting, by an output unit of the computing device, said simplified ABAC policy; and
   utilizing said simplified ABAC policy in place of said full ABAC policy to control access to entities of a system or network,
   wherein said simplified ABAC policy comprises an expression dependent on at least a first argument, which is a subordinate attribute-dependent expression dependent on at least one of the at least one attribute identified as variable, and a second argument, which is a result data field for storing said evaluation result,
   wherein the result data field comprises:

a target result field operable to store at least a Not applicable result from the evaluation of the expression itself, or
   an argument data field operable to store at least an Indeterminate result as said evaluation result.

2. The method of claim 1, wherein the predetermined simplification rules comprise:
   a rule stipulating that an expression evaluable only to Indeterminate is formed in the simplified ABAC policy for each expression in the full ABAC policy which evaluates under the partial request to Indeterminate and which is connected by a deny-overrides combining algorithm to at least one expression that is evaluable to Permit and not completely evaluable under the partial request,
   wherein the value Indeterminate is stored in the result data field.

3. The method of claim 1, wherein the predetermined simplification rules comprise:
   a rule stipulating that an expression evaluable only to Indeterminate is formed in the simplified ABAC policy for each expression in the full ABAC policy which evaluates under the partial request to Indeterminate and which is connected by a permit-overrides combining algorithm to at least one expression that is evaluable to Deny and not completely evaluable under the partial request,
   wherein the value Indeterminate is stored in the result data field.

4. The method of claim 1, wherein the predetermined simplification rules comprise:
   a rule stipulating that one expression evaluable only to Indeterminate is formed in the simplified ABAC policy if there is at least one expression in the full ABAC policy which evaluates under the partial request to Indeterminate and which is connected by a target-type combining algorithm to at least one expression that is not completely evaluable under the partial request,
   wherein the value Indeterminate is stored in the result data field.

5. The method of claim 1, further adapted to evaluate an ABAC policy for policy decision requests satisfying at least one predetermined condition, said method comprising:
   defining, based on said at least one predetermined condition, a partial request;
   constructing said simplified policy based on the ABAC policy and the partial request;
   storing the simplified policy; and
   evaluating any policy decision requests satisfying said at least one predetermined condition using the simplified policy.

6. The method of claim 1, wherein the ABAC policy is encoded in Extended Access Control Markup Language, XACML.

7. A computer-program product comprising a nontransitory data carrier for storing computer-readable instructions for performing the method of claim 1.

8. A computer system comprising:
   a first memory operable to store a full attribute-based access control, ABAC, policy comprising a plurality of attribute-dependent expressions, wherein each expression is evaluable to one of Not applicable, Indeterminate and either Permit or Deny;
   a partial request generation module of a processor operable to construct a partial request comprising at least one attribute value and at least one attribute identified as variable;
   a partial evaluation module of a processor operable to partially evaluate said full ABAC policy by substituting said at least one attribute value for a corresponding attribute appearing in an expression in the policy, by evaluating said expression completely, and by forming, based on an evaluation result on closed form obtained by said complete evaluation of said expression and predetermined simplification rules, a simplified ABAC policy equivalent to the full ABAC policy; and a second memory operable to store said simplified ABAC policy, wherein said simplified ABAC policy is utilized in place of said full ABAC policy to control access to entities of a system or network, wherein the partial evaluation module of the processor is operable to form said simplified ABAC policy so that it comprises an expression dependent on at least a first argument, which is a subordinate attribute-dependent expression dependent on at least one of the at least one attribute identified as variable, and a second argument, which is a result data field for storing said evaluation result, and wherein the result data field comprises:
   a target result field operable to store at least a Not applicable result from the evaluation of the expression itself, or
   an argument data field operable to store at least an Indeterminate result as said evaluation result.

9. The computer system of claim 8, further comprising an interface for receiving policy decision requests satisfying at least one predetermined condition and returning ABAC policy decisions in response hereto, wherein:
   the partial request generation module is operable to construct said partial request on the basis of said predetermined condition; and
   the interface is adapted to evaluate said policy decision requests against the simplified ABAC policy.

10. The computer system of claim 9, wherein the partial request generation module is further operable to identify said predetermined condition on the basis of the received policy decision requests.

* * * * *